United States Patent
Kim (10) Patent No.: US 10,757,525 B2
(45) Date of Patent: Aug. 25, 2020

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Youngbeom Kim, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/424,006

(22) Filed: May 28, 2019

(65) Prior Publication Data

US 2020/0204940 A1  Jun. 25, 2020

(30) Foreign Application Priority Data

Dec. 19, 2018 (KR) .................. 10-2018-0165395

(51) Int. Cl.
*H04S 7/00* (2006.01)
*G10L 21/0232* (2013.01)
(Continued)

(52) U.S. Cl.
CPC .......... *H04S 7/303* (2013.01); *G10L 21/0232* (2013.01); *H04R 1/406* (2013.01);
(Continued)

(58) Field of Classification Search
CPC ...... H04S 7/303; H04S 1/007; H04S 2420/01; H04S 3/008; G10L 21/0232;
(Continued)

(56) References Cited

U.S. PATENT DOCUMENTS 9,516,417 B2 * 12/2016 Cutler .................. H04M 3/568
2009/0129609 A1 * 5/2009 Oh ........................ H04R 1/406
381/92
(Continued)

FOREIGN PATENT DOCUMENTS

JP   2011075027 A  *  4/2011
JP   2017171095 A  *  9/2017

*Primary Examiner* — Davetta W Goins
*Assistant Examiner* — Kuassi A Ganmavo
(74) *Attorney, Agent, or Firm* — Lempia Summerfield Katz LLC (57) ABSTRACT

A vehicle and a method of controlling the vehicle are capable of outputting a sound similar to an original sound by modulating a sound signal obtained using a plurality of microphones of an external terminal device considering the physical characteristics of a user and the sound reproduction space. The vehicle includes: a speaker; a sensor module configured to detect a state of the vehicle; a communicator including a plurality of microphones and configured to receive a sound signal having two channels, information about sensitivity of each microphone of the plurality of microphones, and information about a relative position between the plurality of microphones; and a controller configured to: modulate the sound signal on at least one of the sensitivity of the plurality of microphones, the relative position between the plurality of microphones, and a Head-Related Transfer Function (HRTF); remove the reverberation from the modulated sound signal; and control the speaker.

18 Claims, 7 Drawing Sheets

(51) Int. Cl.
*H04R 1/40* (2006.01)
*H04R 3/00* (2006.01)
*H04S 1/00* (2006.01)
*H04R 5/027* (2006.01)
*G10L 21/0208* (2013.01)
*B60Q 1/26* (2006.01)
*B60W 10/30* (2006.01)
*B60W 30/18* (2012.01)
*B60H 1/00* (2006.01)
*B60Q 1/14* (2006.01)

(52) U.S. Cl.
CPC ............ *H04R 3/005* (2013.01); *H04R 5/027* (2013.01); *H04S 1/007* (2013.01); *B60H 1/00771* (2013.01); *B60Q 1/143* (2013.01); *B60Q 1/2603* (2013.01); *B60W 10/30* (2013.01); *B60W 30/18009* (2013.01); *G10L 2021/02082* (2013.01); *H04R 2499/13* (2013.01); *H04S 2400/15* (2013.01); *H04S 2420/01* (2013.01)

(58) Field of Classification Search
CPC .......... G10L 2021/02082; H04R 1/406; H04R 3/005; H04R 5/027; H04R 2499/12; B60W 30/18009; B60W 10/30; B60H 1/00771; B60Q 1/143; B60Q 1/2603
See application file for complete search history.

(56) References Cited

U.S. PATENT DOCUMENTS

| | | | |
|---|---|---|---|
| 2012/0008806 A1* | 1/2012 | Hess | H04R 1/023 381/302 |
| 2015/0365743 A1* | 12/2015 | Konigsberg | H04R 3/00 381/86 |
| 2017/0229136 A1* | 8/2017 | Ogura | H04R 1/406 |
| 2018/0167731 A1* | 6/2018 | Ohta | H04R 3/02 |
| 2018/0262837 A1* | 9/2018 | Makino | H04R 3/005 |
| 2018/0361937 A1* | 12/2018 | Schmahl | H04W 4/40 |

* cited by examiner

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2018-0165395, filed on Dec. 19, 2018 in the Korean Intellectual Property Office, the disclosure of which is incorporated by reference in its entirety.

TECHNICAL FIELD

The present disclosure relates to a vehicle that outputs an external sound similar to an original sound, and a method of controlling the vehicle.

BACKGROUND

Generally, a user may feel that a recorded sound is different from an original sound using one microphone.

When the recorded sound differs from the original sound, the difference may be due to the fact that there is only one microphone used to record the sound, while the user has two ears to listen to the sound.

Also, since sound may be reflected or diffracted depending on the shape of a user's head or ears and can be transmitted to the user, the user may feel that the recorded sound without reflection or diffraction is different from the original sound.

Further, when the recorded sound is reproduced, the characteristics of the space where the sound is reproduced may be reflected in the recorded sound. Accordingly, the user may feel that the recorded sound is different from the original sound.

SUMMARY

Therefore, it is an aspect of the present disclosure to provide a vehicle capable of outputting a sound similar to an original sound by modulating a sound signal obtained using a plurality of microphones of an external terminal device in consideration of the physical characteristics of a user and the sound reproduction space, and a method of controlling the vehicle.

Additional aspects of the disclosure are set forth in part in the description which follows and, in part, are to be understood from the description or may be learned by practice of the disclosure.

In accordance with an aspect of the present disclosure, a vehicle includes a speaker, a sensor module configured to detect a state of the vehicle, a communicator including a plurality of microphones. The communicator is configured to receive a sound signal having two channels, information about sensitivity of each microphone of the plurality of microphones, and information about a relative position between the plurality of microphones from a terminal apparatus positioned outside of the vehicle. The vehicle also includes a controller configured to modulate the sound signal having two channels based on at least one of the sensitivity of each microphone of the plurality of microphones, the relative position between the plurality of microphones, and a Head-Related Transfer Function (HRTF). The controller is further configured to remove the reverberation corresponding to the state of the vehicle from the modulated sound signal. The controller is also configured to control the speaker to output the dereverberated sound signal.

The controller may determine whether the sensitivities of the plurality of microphones are different based on the sensitivity of each microphone of the plurality of microphones. When the sensitivities of the plurality of microphones are different from each other, the controller may modulate the sound signal having two channels so that the intensity of sound signals corresponding to each microphone of the plurality of microphones are the same.

The controller may modulate the sound signal having two channels so that the intensity of the sound signal corresponding to each microphone of the plurality of microphones becomes equal to the intensity of the sound signal having the strongest intensity.

The controller may determine the difference in value between the relative position between the plurality of microphones and a predetermined relative position between left and right eardrums. The controller may also modulate the sound signal having two channels based on the determined difference value and the relative position of a sound source with respect to the plurality of microphones.

The controller may modulate the sound signal having two channels by adjusting the intensity of the sound signal in proportion to the determined difference value.

When one of the microphones is moved away from a sound source when one of the microphones is positioned at a position separated by a predetermined relative position between the left and right eardrums based on one of the microphones of any one of the plurality of microphones, the controller may modulate the sound signal having two channels so that the intensity of the sound signal corresponding to one of the microphones is decreased.

When one of the microphones approaches from a sound source when one of the microphones is positioned at a position separated by a predetermined relative position between the left and right eardrums based on one of the microphones of any one of the plurality of microphones, the controller may modulate the sound signal having two channels so that the intensity of the sound signal corresponding to one of the microphones is increased.

The controller may modulate the sound signal having two channels by convolving the HRTF corresponding to each of the sound signals having two channels.

The controller may apply a dereverberation function corresponding to the state of the vehicle to the modulated sound signal to remove the reverberation corresponding to the state of the vehicle from the modulated sound signal.

The state of the vehicle may include at least one of a speed of the vehicle, an acceleration of the vehicle, whether the vehicle is vibrating, whether each window of a plurality of windows is opened or closed, whether an air conditioner is operated, and whether passengers are seated in each seat of a plurality of seats.

In accordance with another aspect of the present disclosure, in a method of controlling a vehicle, the vehicle includes a speaker and a sensor module configured to detect a state of the vehicle. The method of controlling the vehicle includes receiving, by a communicator including a plurality of microphones, a sound signal having two channels, information about sensitivity of each microphone of the plurality of microphones, and information about a relative position between the plurality of microphones from a terminal apparatus positioned outside of the vehicle. The method further includes modulating, by a controller, the sound signal having two channels based on at least one of the sensitivity of each microphone of the plurality of microphones, the relative position between the plurality of microphones, and a Head-Related Transfer Function (HRTF). The method further includes removing, by the controller, reverberation corresponding to the state of the vehicle from the modulated sound signal. The method also includes controlling, by the controller, the speaker to output the dereverberated sound signal.

The modulating of the sound signal having two channels may include determining whether the sensitivities of the plurality of microphones are different based on the sensitivity of each microphone of the plurality of microphones. When the sensitivities of the plurality of microphones are different from each other, the modulating of the sound signal may further include modulating the sound signal having two channels so that the intensity of sound signals corresponding to each of the plurality of microphones are the same.

The modulating of the sound signal having two channels may include modulating the sound signal having two channels so that the intensity of the sound signal corresponding to each of the plurality of microphones becomes equal to the intensity of the sound signal having the strongest intensity.

The modulating of the sound signal having two channels may include determining a difference value between the relative position between the plurality of microphones and a predetermined relative position between left and right eardrums. The modulating of the sound signal having two channels may further include modulating the sound signal having two channels based on the determined difference value and the relative position of a sound source with respect to the plurality of microphones.

The modulating of the sound signal having two channels may include modulating the sound signal having two channels by adjusting the intensity of the sound signal in proportion to the determined difference value.

The modulating of the sound signal having two channels may include when one of the microphones is moved away from a sound source when one of the microphones is positioned at a position separated by a predetermined relative position between the left and right eardrums based on one of the microphones of any one of the plurality of microphones, modulating the sound signal having two channels so that the intensity of the sound signal corresponding to one of the microphones is decreased.

The modulating of the sound signal having two channels may include when one of the microphones approaches from a sound source when one of the microphones is positioned at a position separated by a predetermined relative position between the left and right eardrums based on one of the microphones of any one of the plurality of microphones, modulating the sound signal having two channels so that the intensity of the sound signal corresponding to one of the microphones is increased.

The modulating of the sound signal having two channels may include modulating the sound signal having two channels by convolving the HRTF corresponding to each of the sound signals having two channels.

The removing of the reverberation from the modulated sound signal may include applying a dereverberation function corresponding to the state of the vehicle to the modulated sound signal to remove the reverberation corresponding to the state of the vehicle from the modulated sound signal.

The state of the vehicle may include at least one of a speed of the vehicle, an acceleration of the vehicle, whether the vehicle is vibrating, whether each window of a plurality of windows is opened or closed, whether an air conditioner is operated, and whether passengers are seated in each of a plurality of seats.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numbers refer to like elements throughout this specification. This specification does not describe all components of the embodiments. General information in the technical field to which the disclosure belongs or overlapping information between the embodiments is not described.

It should be understood that when a component is referred to as being "connected" to another component, it can be directly or indirectly connected to the other component. When a component is indirectly connected to another component, it may be connected to the other component through a wireless communication network.

Also, it should be understood that the terms "includes," "comprises," "including," and/or "comprising," when used in this specification, specify the presence of a stated component, but do not preclude the presence or addition of one or more other components.

Also, it should be understood that the singular forms "a," "an," and "the" include plural referents unless the context clearly dictates otherwise.

As used herein, the terms "portion," "unit," "block," "member," or "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

Reference numerals used in operations are provided for convenience of description, without describing the order of the operations, and the operations can be executed in a different order from the stated order unless a specific order is definitely specified in the context.

Hereinafter, embodiments of a vehicle according to an aspect and a method of controlling the vehicle are described in detail with reference to the accompanying drawings.

Figure 1:
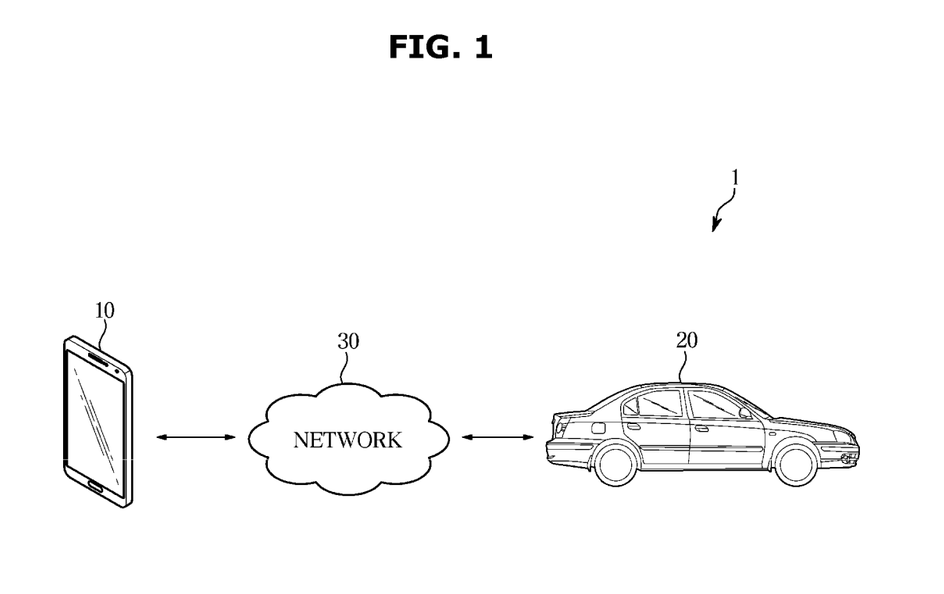
FIG. 1 is a view illustrating a configuration of a sound reproduction system including a terminal apparatus and a vehicle according to an embodiment of the present disclosure.

FIG. 1 is a view illustrating a configuration of a sound reproduction system including a terminal apparatus and a vehicle according to an embodiment of the present disclosure.

Referring to FIG. 1, a sound reproduction system 1 according to an embodiment may include a terminal apparatus 10 for generating a sound signal by reproducing a sound at a specific location and a vehicle 20 for modulating and outputting the sound signal received from the terminal apparatus 10 through a network 30.

In other words, the terminal apparatus 10 of the sound reproduction system 1 is positioned outside the vehicle 20. The terminal apparatus 10 may record the sound at a location where the vehicle 20 is positioned, thereby generating the sound signal. To this end, the terminal apparatus 10 may include a plurality of microphones and may generate the sound signal having two channels using the plurality of microphones.

In this case, the sound signal having two channels may correspond to the sound signal obtained using one of the microphones positioned on the left side of a sound source and the sound signal obtained using one of the microphones positioned on the right side of the sound source.

The sound signal generated through the terminal apparatus 10 may be transmitted to the vehicle 20 through the network 30. In other words, the terminal apparatus 10 may communicate with the vehicle 20 by being connected to the network 30 through wireless communication.

The wireless communication may be, for example, 5th Generation (5G), Long-Term Evolution (LTE), LTE Advance (LTE-A), Code Division Multiple Access (CDMA), Wideband CDMA (WCDMA), Universal Mobile Telecommunications System (UMTS), wireless broadband (WiBro), Global System for Mobile communications (GSM), or the like. According to an embodiment, the wireless communication may include, for example, wireless fidelity (WiFi), Bluetooth, Bluetooth low power (BLE), Zigbee, Near Field Communication (NFC), Magnetic Secure Transmission Frequency (RF), or Body Area Network (BAN). According to an embodiment, the wireless communication may include GNSS. The GNSS may refer to, for example, a Global Positioning System (GPS), a Global Navigation Satellite System (GLONASS), a BeiDou Navigation Satellite System (hereinafter, referred to as "BeiDou"), and Galileo, an European global satellite-based navigation system.

The network 30 may include at least one of a telecommunications networks, for example, a computer network (e.g., local area network (LAN) or wide area network (WAN)), the Internet, or a telephone network.

The vehicle 20 receiving the sound signal from the terminal apparatus 10 may modulate the received sound signal based on the physical characteristics of a user and the state of the vehicle 20 and may control a speaker provided inside of the vehicle 20 to output the modulated sound signal.

Hereinafter, operations of the terminal apparatus 10 and the vehicle 20 are described by hardware components.

Figure 2:
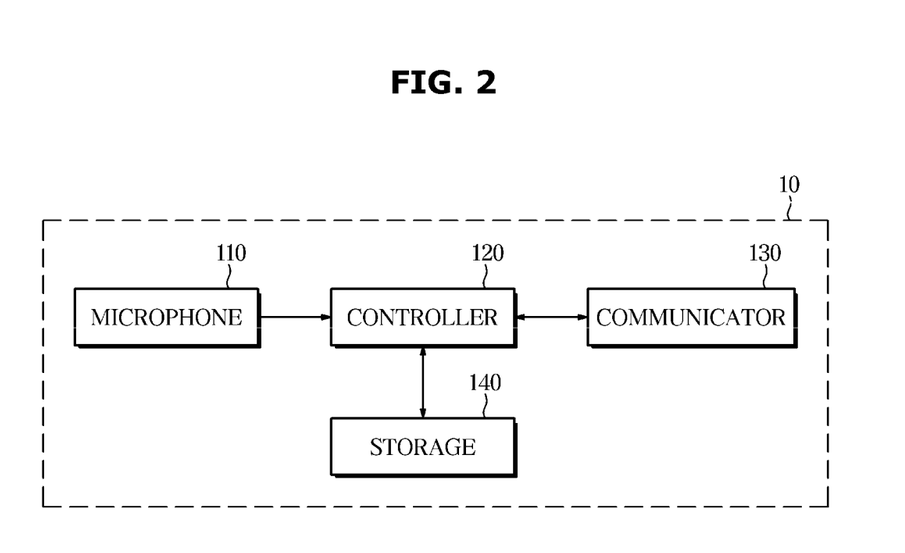
FIG. 2 is a control block diagram of the terminal apparatus according to an embodiment of the present disclosure.

FIG. 2 is a control block diagram of the terminal apparatus 10 according to an embodiment.

Referring to FIG. 2, the terminal apparatus 10 according to an embodiment may include a microphone 110 for receiving the sound output from the sound source, a controller 120 for generating the sound signal having two channels based on the received sound, a communicator 130 for transmitting to the vehicle 20 information about the generated sound signal and sensitivity of the microphone 110, and information about a relative position between the microphones 110.

A plurality of the microphones 110 according to an embodiment are provided, and each microphone of the plurality of microphones 110 may receive the sound output from the sound source.

Each of the microphones 110 may have different sensitivities. At this time, the sensitivity of the microphone may indicate an output voltage of the microphone when a predetermined sound wave (e.g., a sine wave of 1 Pa and 1 kHz) is output at a specific position (e.g., 1 m separation point). In other words, the sensitivity of the microphone 110 may correspond to the intensity at which the microphone receives the sound output from the sound source. For example, the sound received from the microphone 110 with a high sensitivity of the microphone 110 may have a higher intensity than the sound received from the microphone 110 with a low sensitivity of the microphone 110.

The controller 120 according to an embodiment may generate the sound signal having two channels based on sounds received from the plurality of microphones 110. In this case, the sound signal having two channels may correspond to the sound signal obtained using the microphone 110 positioned on the left side of the sound source and the sound signal obtained using the microphone 110 positioned on the right side of the sound source.

The controller 120 may include at least one memory 140 storing a program for performing the above-described operations and operations, which is described below, and at least one processor for executing the stored program. When there are a plurality of memories and processors, they may be integrated into one chip or provided at physically separated positions.

The communicator 130 according to an embodiment may transmit the sound signal having two channels generated from the controller 120 to the vehicle 20 through the network 30.

Also, the communicator 130 may receive a request for the sound signal from the vehicle 20. In this case, the request received from the vehicle 20 may be transmitted to the controller 120, and the controller 120 may control the communicator 130 to start sound signal generation or transmit the generated sound signal based on the request.

A storage 140 according to an embodiment may store information required for operation of the terminal apparatus 10. For example, the storage 140 may store information about the sensitivity each microphone of the plurality of microphones 110 and information about the relative position between the plurality of microphones 110 and may store the sound signal generated by the controller 120.

The storage 140 may correspond to a memory for storing the above-described information and the following information, and may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, (for example Hard Disk Drive (HDD) and Compact Disc Read Only Memory (CD-ROM)), although not limited thereto.

Figure 3:
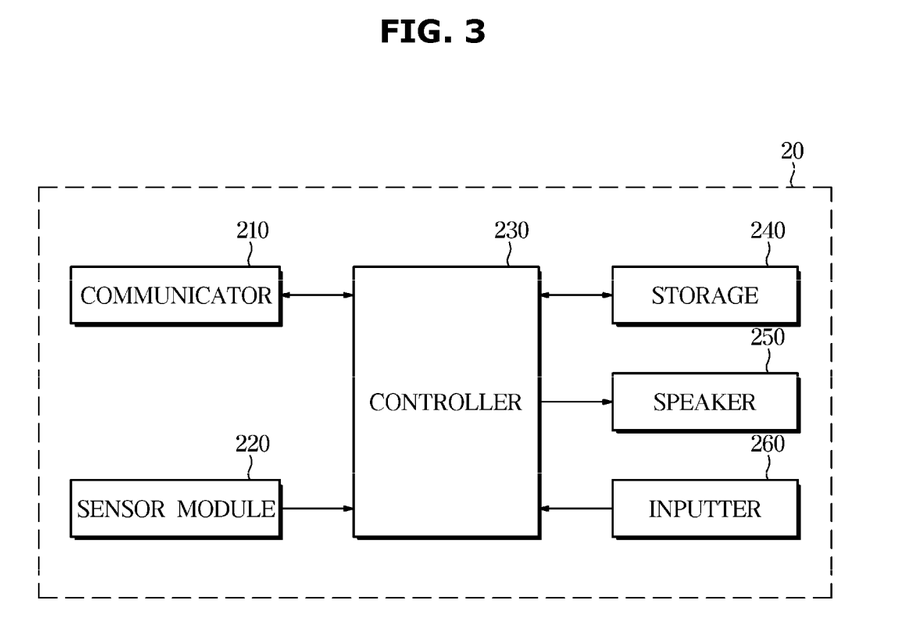
FIG. 3 is a control block diagram of the vehicle according to an embodiment of the present disclosure.

FIG. 3 is a control block diagram of the vehicle according to an embodiment.

Referring to FIG. 3, the vehicle 20 according to an embodiment may include a communicator 210 for communicating with the terminal apparatus 10 through the network 30, a sensor module 220 for detecting the state of the vehicle 20, a controller 230 for modulating the sound signal having two channels received from the terminal apparatus 10 through the communicator 210, a storage 240 for storing information required for various controls of the vehicle 20, a speaker 250 for outputting the sound signal, and an inputter 260 for receiving an input from the user.

The communicator 210 may communicate with the terminal apparatus 10 through the network 30.

Particularly, the communicator 210 may receive the sound signal having two channels from the terminal apparatus 10, information about sensitivity of each of the plurality of microphones 110 provided in the terminal apparatus 10, and information about the relative position between the plurality of microphones 110.

The sound signal having two channels received from the terminal apparatus 10 may include the sound signal obtained using the microphone 110 positioned on the left side of the sound source and the sound signal obtained using the microphone 110 positioned on the right side of the sound source.

In addition, the information about the sensitivity of each microphone of the plurality of microphones 110 may indicate the sensitivity of each microphone of the plurality of microphones 110. In other words, the information on the sensitivity of each of the plurality of microphones 110 may indicate information about the intensity of sound received by each microphone of the plurality of microphones 110.

The information about the relative position between the plurality of microphones 110 may indicate information about the relative positions of the microphones based on any one of the plurality of microphones 110. At this time, the relative position may be expressed by distance, direction and angle.

In addition, the communicator 210 may transmit a message requesting the sound signal to the terminal apparatus 10 based on the input of the user inputted through the inputter 260.

Thereby, the vehicle 20 may receive from the terminal apparatus 10 the sound signal obtained by the terminal apparatus 10 positioned at a specific location outside the vehicle 20. Although not limited thereto, the sound signal may be transmitted to the vehicle 20 according to the selection of the user of the terminal apparatus 10, even when there is no request from the vehicle 20.

The sensor module 220 may detect the state of the vehicle 20.

At this time, the state of the vehicle 20 may include at least one of a speed of the vehicle 20, an acceleration of the vehicle 20, whether the vehicle 20 is vibrating, whether each window of a plurality of windows is opened or closed, whether an air conditioner is operated, and whether passengers are seated in each seat of a plurality of seats.

To this end, the sensor module 220 may include a vehicle speed sensor for detecting a driving speed of the vehicle 20, a steering wheel sensor for detecting an angle of a steering wheel (not shown), an acceleration sensor for detecting an acceleration of the vehicle 20, an accelerator pedal sensor for detecting a position of an accelerator pedal, a brake pedal sensor for detecting a position of a brake pedal (brake), a window position sensor for measuring whether a plurality of the windows are opened or closed, an air conditioner sensor for measuring whether the air conditioner is operated, and a seat sensor for each of the seats to detect the passenger state of the vehicle 20.

At this time, the window position sensor may be provided in each of the windows provided in the vehicle 20 and may detect whether each of the windows is opened or closed. At this time, the plurality of windows may include a door window provided in each door of the vehicle 20 and a loop window provided in a loop of the vehicle 20.

Also, the air conditioner sensor may be provided as at least one of a wind direction sensor and a current measuring sensor, and may detect whether the air conditioner is operated.

The seat sensor may correspond to a pressure sensor provided in each of the seats provided in the vehicle 20 and may determine if a passenger is sitting on each seat based on the pressure applied to the seat. However, the seat sensor is not limited to these, and may include a camera device provided on each seat side.

The controller 230 according to an embodiment may modulate the sound signal having two channels received from the terminal apparatus 10 and may control the speaker 250 provided in the vehicle 20 to output the modulated sound signal.

The controller 230 may modulate the sound signal having two channels received from the terminal apparatus 10 based on at least one of the sensitivity of the plurality of microphones 110, the relative position between the plurality of microphones 110, and a Head-Related Transfer Function (HRTF).

Particularly, the controller 230 may determine whether the sensitivities of the plurality of microphones 110 are different based on the sensitivity of the plurality of microphones 110. When the sensitivities of the plurality of microphones 110 are different from each other, the controller 230 may modulate the sound signal having two channels so that the intensity of sound signals corresponding to each of the plurality of microphones 110 are the same.

For example, the controller 230 may modulate the sound signal having two channels so that the intensity of the sound signal corresponding to each of the plurality of microphones 110 becomes equal to the intensity of the sound signal having the strongest intensity.

In addition, the controller 230 may determine a difference value between the relative position between the plurality of microphones 110 and a predetermined relative position between the left and right eardrums. The controller 230 may modulate the sound signal having two channels based on the determined difference value and the relative position of the sound source with respect to the plurality of microphones 110. At this time, the controller 230 may modulate the sound signal having two channels by adjusting the intensity of the sound signal in proportion to the determined difference value.

For example, when one of the microphones is moved away from the sound source when one of the microphones is positioned at a position separated by a predetermined relative position between the left and right eardrums based on one of the microphones of any one of the plurality of microphones 110, the controller 230 may modulate the sound signal having two channels so that the intensity of the sound signal corresponding to one of the microphones is decreased.

Also, when one of the microphones approaches from the sound source when one of the microphones is positioned at a position separated by the predetermined relative position between the left and right eardrums based on one of the microphones of any one of the plurality of microphones 110, the controller 230 may modulate the sound signal having two channels so that the intensity of the sound signal corresponding to one of the microphones is increased.

At this time, the communicator 210 of the vehicle 20 may transmit relative position information about the microphone 110 of the sound source from the terminal apparatus 10.

In addition, the controller 230 may modulate the sound signal having two channels by convolving the HRTF corresponding to each of the sound signals having two channels.

The controller 230 may remove the reverberation corresponding to the state of the vehicle 20 from the modulated sound signal based on at least one of the sensitivity of the plurality of microphones 110, the relative position between the plurality of microphones 110, and the HRTF.

Particularly, the controller 230 may apply a dereverberation function corresponding to the state of the vehicle 20 to the modulated sound signal to remove the reverberation corresponding to the state of the vehicle 20 from the modulated sound signal.

The controller 230 may control the speaker 250 to output the dereverberated sound signal.

Thereby, the user of the vehicle 20 may be provided with the sound signal similar to an original sound of the sound source in a specific area where the terminal apparatus 10 is positioned.

The controller 230 may include at least one memory storing a program for performing the above-described operations and operations, which are described below, and at least one processor for executing the stored program. When there are a plurality of memories and processors, they may be integrated into one chip or provided at physically separated positions.

The storage 240 according to an embodiment may store various information required for controlling the vehicle 20.

Particularly, the storage 240 may store the HRTF used for modulation of the sound signal. In this case, the HRTF may be a function reflecting the characteristics of the sound signal transmitted from the sound source to the left and right ears of the user. In other words, the HRTF may be expressed as a three-dimensional function by measuring the frequency response including both the diffraction or reflection characteristics when the sound is transmitted to the ears of the left and right sides of the user. In other words, the HRTF may include the HRTF for the left side and the HRTF for the right side.

The sound signal to which the HRTF is applied may reflect human physical characteristics to the sound signal mechanically received through the plurality of microphones 110 without consideration of human physical characteristics. Thus, the user who listens to the sound signal modulated by the HRTF may perceive that he/she is listening to the sound in the location where the sound source is positioned.

In addition, the storage 240 may store information about the relative position between the left and right eardrums. At this time, the relative position between the left and right eardrums indicated by the information about the relative position between the left and right eardrums may correspond to the relative position between the left and right eardrums measured on a standard person.

The storage 240 may also store a corresponding dereverberation function for each state of the vehicle 20. In other words, the storage 240 may store the dereverberation function corresponding to the state of each of the vehicle 20. The dereverberation function may be set and stored based on the measured sound characteristics in a state in which the state of each of the vehicle 20 is prepared at the design stage of the vehicle 20.

At this time, the dereverberation function may correspond to the sound signal having an opposite phase of noise that may occur inside of the vehicle 20 depending on the state of the vehicle 20. In other words, the vehicle 20 may synthesize the dereverberation function to the sound signal received from the terminal apparatus 10 so that the noise according to the state of the vehicle 20 can be removed when the sound signal received from the terminal apparatus 10 is outputted.

The storage 240 may correspond to a memory for storing the above-described information and the following information. The storage 240 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, (for example, Hard Disk Drive (HDD) and Compact Disc Read Only Memory (CD-ROM)), although not limited thereto.

The speaker 250 according to an embodiment may output the modulated and dereverberated sound signal received from the controller 230 to the inside of the vehicle 20 under the control of the controller 230.

Thus, the user of the vehicle 20 may listen to the sound signal close to the original sound and perceive that he/she is listening to the original sound in the location where the terminal apparatus 10 is positioned.

For this purpose, the speaker 250 may be provided inside of the vehicle 20 and may be provided without limitation as long as the speaker 250 can listen to the sound signal output by the user of the vehicle 20.

The inputter 260 according to an embodiment may receive the input of the user of the vehicle 20.

Particularly, the inputter 260 may receive the input requesting the sound signal from the user of the vehicle 20 to the terminal apparatus 10 positioned outside of the vehicle 20. In this case, the controller 230 may control the communicator 210 to transmit the message requesting the sound signal to the terminal apparatus 10 based on the user's input. However, the disclosure is not limited thereto, and the sound signal may be transmitted to the vehicle 20 according to the selection of the user of the terminal apparatus 10, even when there is no request from the vehicle 20.

At this time, the inputter 260 may be provided in a center fascia (not shown) installed at the center of a dashboard and may be implemented with mechanical buttons, knobs, touch pad, touch screen, stick-type manipulation device, trackball, or the like. At this time, the inputter 260 disposed on the touch screen may be provided on a display (not shown) provided inside of the vehicle 20. However, the position and implementation method of the inputter 260 are not limited to the above-described example and may be included without limitation as long as the position and the implementation method can receive the user's input.

Figure 4:
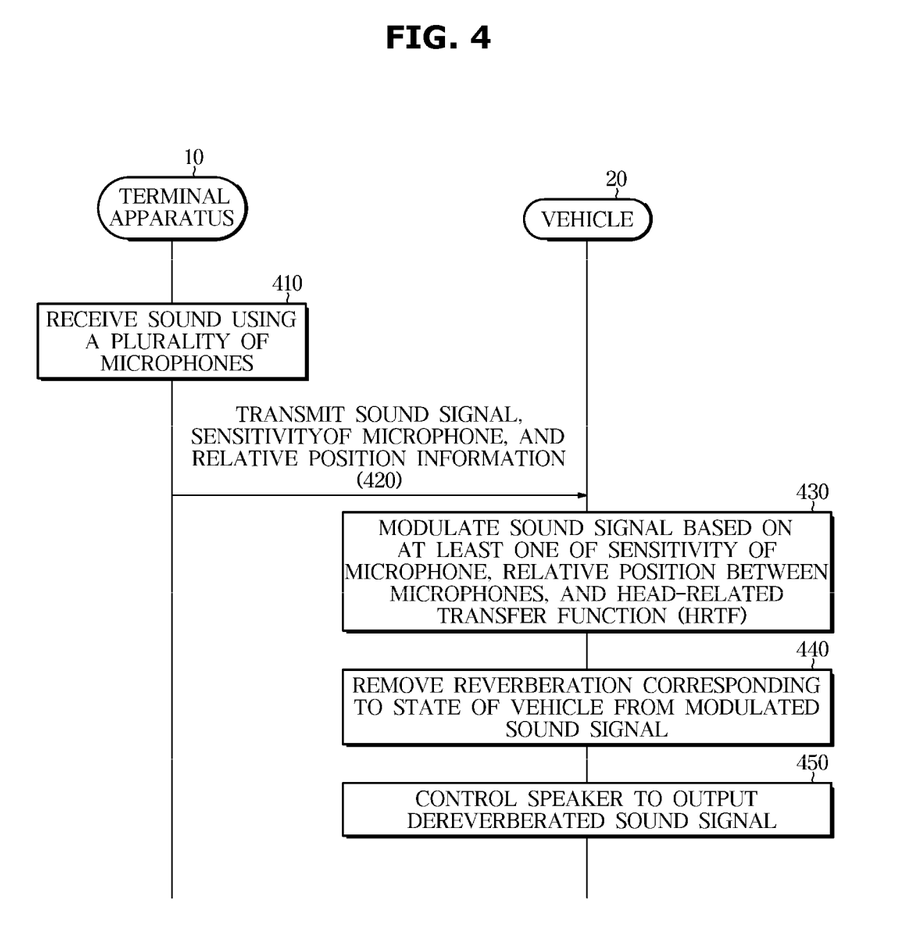
FIG. 4 is a signal flow diagram schematically illustrating an operation process of the vehicle according to an embodiment of the present disclosure.
Figure 5:
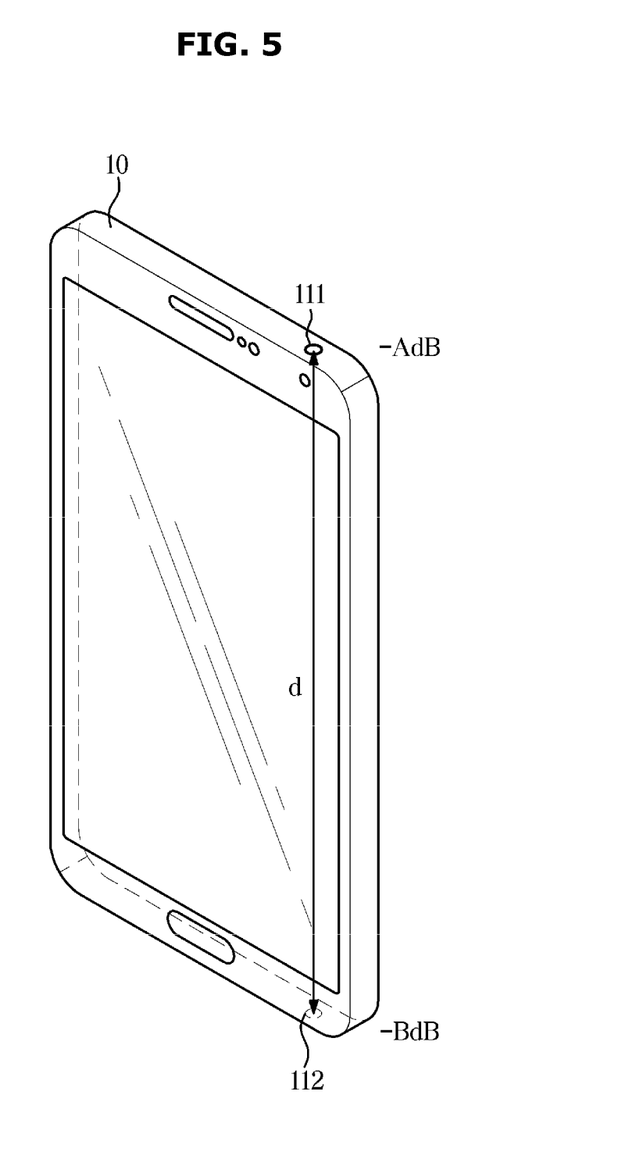
FIG. 5 is a view illustrating a relative position between a plurality of microphones and the sensitivity of each microphone of the plurality of microphones of the terminal apparatus according to an embodiment of the present disclosure.
Figure 6:
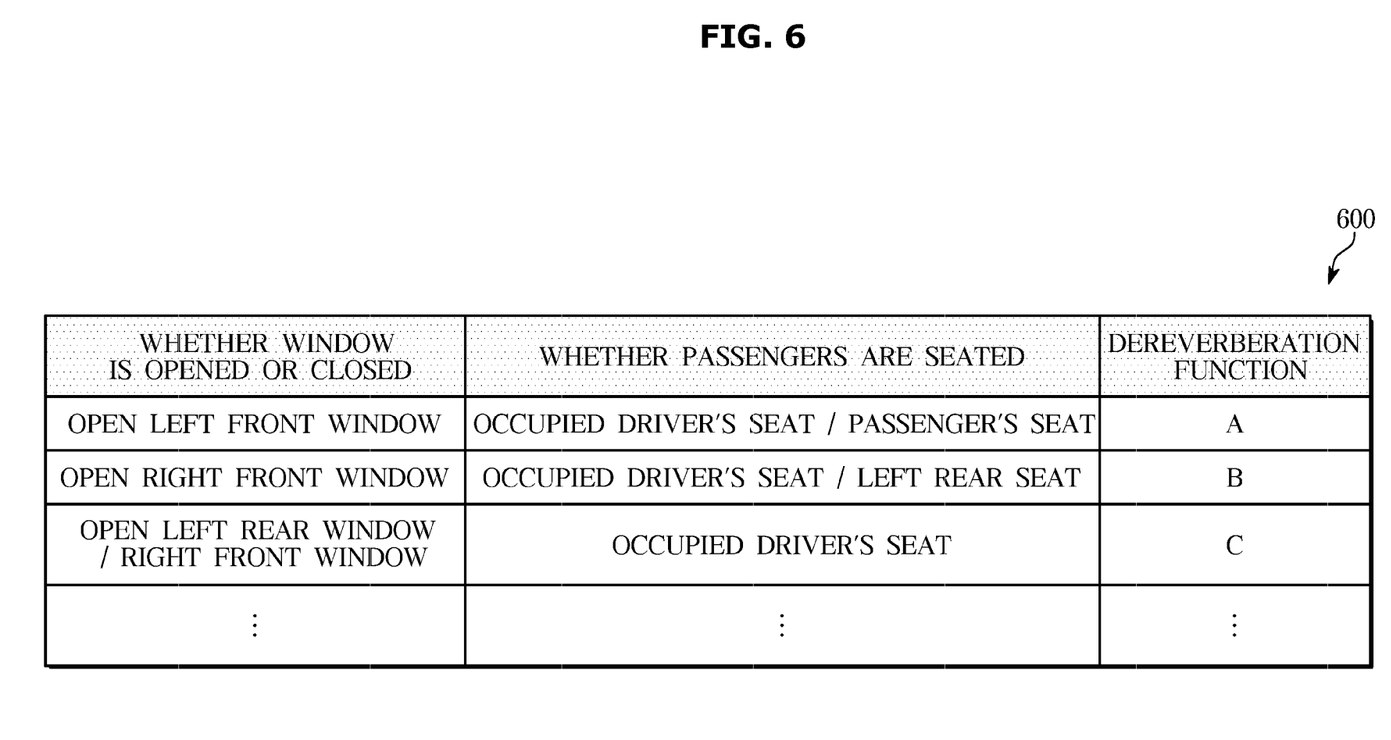
FIG. 6 is a view illustrating a dereverberation function according to the state of the vehicle according to an embodiment of the present disclosure.

FIG. 4 is a signal flow diagram schematically illustrating an operation process of the vehicle according to an embodiment. FIG. 5 is a view illustrating a relative position between a plurality of microphones and the sensitivity of each of the plurality of microphones of the terminal apparatus according to an embodiment. FIG. 6 is a view illustrating a dereverberation function according to the state of the vehicle according to an embodiment.

Referring to FIG. 4, the terminal apparatus 10 according to an embodiment may receive the sound using the plurality of microphones 110 (410). At this time, the controller 120 of the terminal apparatus 10 may generate the sound signal having two channels corresponding to the received sound.

In this case, the sound signal having two channels may include the sound signal obtained using the microphone positioned on the left side of the sound source and the sound signal obtained using the microphone positioned on the right side of the sound source as a single channel.

The terminal apparatus 10 according to an embodiment may transmit the sound signal, the sensitivity of the microphone 110, and relative position information (420). Particularly, the terminal apparatus 10 may transmit the sound signal having two channels obtained through the plurality of microphones 110. Also, the terminal apparatus 10 may transmit information about the sensitivity of each of the plurality of microphones 110 and may transmit information about the relative position between the plurality of microphones 110.

The information about the sensitivity of each of the plurality of microphones 110 may indicate the sensitivity of each of the plurality of microphones 110. In other words, the information on the sensitivity of each of the plurality of microphones 110 may indicate information about the intensity of sound received by each of the plurality of microphones 110.

The information about the relative position between the plurality of microphones 110 may indicate information about the relative positions of the microphones based on any one of the plurality of microphones 110. At this time, the relative position may be expressed by distance, direction and angle.

At this time, information about the sensitivity of each of the plurality of microphones 110 and information about the relative position between the plurality of microphones 110 may be stored in the storage 140 of the terminal apparatus 10.

Referring to FIG. 5, the terminal apparatus 10 may include the plurality of microphones 110. Particularly, the plurality of microphones 110 may include a first microphone 111 provided on one side of the terminal apparatus 10 and a second microphone 112 provided on the other side of the terminal apparatus 10.

For example, the terminal apparatus 10 may correspond to a smartphone, the first microphone 111 may correspond to the microphone provided for video communication, and the second microphone 112 may correspond to the microphone provided for audio communication. However, the embodiments of the disclosure are not limited thereto, and an electronic apparatus capable of providing the plurality of microphones may be used as the terminal apparatus 10 without limitation.

The storage 140 of the terminal apparatus 10 may store information about the relative positions (e.g., "d" in FIG. 5) between the plurality of microphones 110 and the sensitivity of each of the plurality of microphones 110 (e.g., "−AdB" and "−BdB" in FIG. 5).

Referring again to FIG. 4 and FIG. 5, the vehicle 20 may modulate the sound signal based on at least one of the sensitivity of the microphone, the relative position between the microphones, and the HRTF (430).

In other words, the controller 230 of the vehicle 20 may modulate the sound signal having two channels received from the terminal apparatus 10 based on at least one of sensitivity each microphone of the plurality of microphones 110, the relative position between the plurality of microphones 110, and the HRTF.

Particularly, the controller 230 may determine whether the sensitivities of the plurality of microphones 110 are different based on the sensitivity of each microphone of the plurality of microphones 110. When the sensitivities of the plurality of microphones 110 are different from each other, the controller 230 may modulate the sound signal having two channels so that the intensity of sound signals corresponding to each of the plurality of microphones 110 are the same.

For example, the controller 230 may modulate the sound signal having two channels so that the intensity of the sound signal corresponding to each of the plurality of microphones 110 becomes equal to the intensity of the sound signal having the strongest intensity.

In other words, when the sensitivity −AdB of the first microphone 111 is lower than the sensitivity −BdB of the second microphone 112, the sound signal corresponding to the first microphone 111 may be modulated to have the same intensity as the sound signal corresponding to the second microphone 112.

Thus, the difference between the sound signals corresponding to the respective channels according to the sensitivity difference of each of the microphones 110 may be corrected. It is considered that the sensitivity of the ears of the left and right sides of the user is not different when the user of the vehicle 20 is positioned at the location where the terminal apparatus 10 is positioned and listens to the sound.

In addition, the controller 230 may determine a difference value between the relative position between the plurality of microphones 110 and a predetermined relative position between the left and right eardrums. The controller 204 may modulate the sound signal having two channels based on the determined difference value and the relative position of the sound source with respect to the plurality of microphones 110. At this time, the controller 230 may modulate the sound signal having two channels by adjusting the intensity of the sound signal in proportion to the determined difference value.

For example, when the second microphone 112 is moved away from the sound source when it is assumed that the second microphone 112 is positioned at the position separated by the predetermined relative position between the left and right eardrums based on the first microphone 111 of the plurality of microphones 110, i.e., when the sound source is on the first microphone 111 side, the controller 230 may modulate the sound signal having two channels so that the intensity of the sound signal corresponding to the second microphone 112 is decreased.

Also, when the second microphone 112 approaches from the sound source when it is assumed that the second microphone 112 is positioned at the position separated by the predetermined relative position between the left and right eardrums based on the first microphone 111 of the plurality of microphones 110, i.e., when the sound source is on the second microphone 112 side, the controller 230 may modulate the sound signal having two channels so that the intensity of the sound signal corresponding to the second microphone 112 is increased.

At this time, the communicator 210 of the vehicle 20 may transmit relative position information about the microphone 110 of the sound source from the terminal apparatus 10.

In this way, the physical characteristics of the user of the vehicle 20 may be reflected to the sound signal having two channels, and the modulated sound signal may be similar to the sound when the user listens to the original sound.

In addition, the controller 230 may modulate the sound signal having two channels by convolving the HRTF corresponding to each of the sound signals having two channels.

At this time, the HRTF may be the function reflecting the characteristics of the sound signal transmitted from the sound source to the left and right ears of the user. In other words, the HRTF may be expressed as the three-dimensional function by measuring the frequency response including both the diffraction or reflection characteristics when the sound is transmitted to the ears of the left and right sides of the user. In other words, the HRTF may include the HRTF for the left side and the HRTF for the right side.

The sound signal to which the HRTF is applied may reflect human physical characteristics to the sound signal mechanically received through the plurality of microphones 110 without consideration of human physical characteristics. Thus, the user who listens to the sound signal modulated by the HRTF may perceive that he/she is listening to the sound in the location where the sound source is positioned.

The vehicle 20 may remove the reverberation corresponding to the state of vehicle 20 from the modulated sound signal (440).

In other words, the controller 230 of the vehicle 20 may remove the reverberation corresponding to the state of the vehicle 20 from the modulated sound signal based on at least one of the sensitivity of the plurality of microphones 110, the relative position between the plurality of microphones 110, and the HRTF.

Particularly, the controller 230 may apply the dereverberation function corresponding to the state of the vehicle 20 to the modulated sound signal to remove the reverberation corresponding to the state of the vehicle 20 from the modulated sound signal.

At this time, the controller 230 may determine the dereverberation function corresponding to the current state of the vehicle 20 detected by the sensor module 220. Particularly, the controller 230 may select the dereverberation function corresponding to the current state of the vehicle 20 among the state-specific dereverberation functions of the vehicle stored in the storage 240. The controller 230 may apply or synthesize, the selected dereverberation function to the modulated sound signal.

As such, the storage 240 may store the dereverberation function for each state of the vehicle 20.

Particularly, the storage 240 may store the dereverberation function corresponding to the state of each of the vehicle 20, as illustrated in FIG. 6. The dereverberation function may be set and stored based on the measured sound characteristics in a state in which the state of each of the vehicle 20 is prepared at the design stage of the vehicle 20.

At this time, the dereverberation function may correspond to the sound signal having the opposite phase of noise that may occur inside of the vehicle 20 depending on the state of the vehicle 20. In other words, the vehicle 20 may synthesize the dereverberation function to the sound signal received from the terminal apparatus 10 so that the noise according to the state of the vehicle 20 can be removed when the sound signal received from the terminal apparatus 10 is outputted.

FIG. 6 illustrates an embodiment 600 in which the dereverberation function can be changed based on whether the window is opened or closed and whether or not a passenger is seated The state of the vehicle 20 on which the selection of the dereverberation function is based may include at least one of the speed of the vehicle 20, the acceleration of the vehicle 20, whether the vehicle 20 is vibrating, whether each window of the plurality of windows is opened or closed, whether the air conditioner is operated, and whether passengers are seated in each seat of the plurality of seats.

The vehicle 20 may control the speaker 250 to output the dereverberated sound signal (450). Thereby, the user of the vehicle 20 may be provided with the sound signal similar to the original sound of the sound source in the specific area where the terminal apparatus 10 is positioned.

Hereinafter, an embodiment of a control method of the vehicle 20 according to an aspect of the disclosure is described. The vehicle 10 according to the above-described embodiment of the disclosure may be applied with the control method of the vehicle 20. Therefore, descriptions given above with reference to FIGS. 1-6 may be applied with the control method of the vehicle 10 in the same manner.

Figure 7:
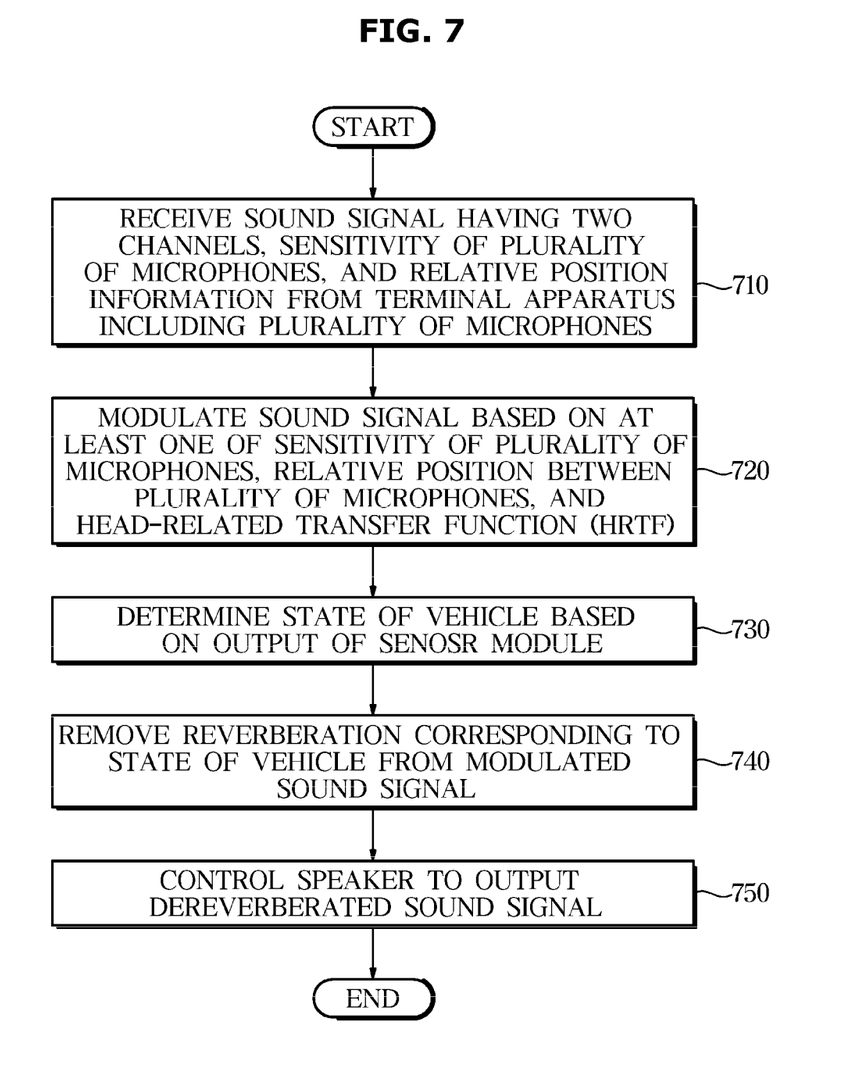
FIG. 7 is a flowchart illustrating an example of outputting a modulated sound signal in a method of controlling the vehicle according to an embodiment of the present disclosure.

FIG. 7 is a flowchart illustrating outputting a modulated sound signal in a method of controlling the vehicle according to an embodiment.

The vehicle 20 may receive the sound signal having two channels, the sensitivity of the plurality of microphones 110, and the relative position information from the terminal apparatus 10 including the plurality of microphones 110 (710).

Particularly, the communicator 210 of the vehicle 20 may receive the sound signal having two channels from the terminal apparatus 10, the information about the sensitivity of each of the plurality of microphones 110 provided in the terminal apparatus 10, and the information about the relative position between the plurality of microphones 110.

The sound signal having two channels received from the terminal apparatus 10 may include the sound signal obtained using the microphone 110 positioned on the left side of the sound source and the sound signal obtained using the microphone 110 positioned on the right side of the sound source.

In addition, the information about the sensitivity of each of the plurality of microphones 110 may indicate the sensitivity of each of the plurality of microphones 110. In other words, the information on the sensitivity of each of the plurality of microphones 110 may indicate information about the intensity of sound received by each of the plurality of microphones 110.

The information about the relative position between the plurality of microphones 110 may indicate information about the relative positions of the microphones based on any one of the plurality of microphones 110. At this time, the relative position may be expressed by distance, direction and angle.

The vehicle 20 may modulate the sound signal based on at least one of the sensitivity of the plurality of microphones 110, the relative position between the plurality of microphones 110, and the HRTF (720).

In other words, the controller 230 of the vehicle 20 may modulate the sound signal having two channels received from the terminal apparatus 10 based on at least one of the sensitivity of the plurality of microphones 110, the relative position between the plurality of microphones 110, and the HRTF.

Particularly, the controller 230 may determine whether the sensitivities of the plurality of microphones 110 are different based on the sensitivity of the plurality of microphones 110. When the sensitivities of the plurality of microphones 110 are different from each other, the controller 230 may modulate the sound signal having two channels so that the intensity of sound signals corresponding to each of the plurality of microphones 110 are the same.

For example, the controller 230 may modulate the sound signal having two channels so that the intensity of the sound signal corresponding to each of the plurality of microphones 110 becomes equal to the intensity of the sound signal having the strongest intensity.

In addition, the controller 230 may determine a difference value between the relative position between the plurality of microphones 110 and a predetermined relative position between the left and right eardrums. The controller 230 may modulate the sound signal having two channels based on the determined difference value and the relative position of the sound source with respect to the plurality of microphones 110. At this time, the controller 230 may modulate the sound signal having two channels by adjusting the intensity of the sound signal in proportion to the determined difference value.

In one example, when one of the microphones is moved away from the sound source when one of the microphones is positioned at a position separated by a predetermined relative position between the left and right eardrums based on one of the microphones of any one of the plurality of microphones 110, the controller 230 may modulate the sound signal having two channels so that the intensity of the sound signal corresponding to one of the microphones is decreased.

Also, when one of the microphones approaches from the sound source when one of the microphones is positioned at a position separated by the predetermined relative position between the left and right eardrums based on one of the microphones of any one of the plurality of microphones 110, the controller 230 may modulate the sound signal having two channels so that the intensity of the sound signal corresponding to one of the microphones is increased.

At this time, the communicator 210 of the vehicle 20 may transmit relative position information about the microphone 110 of the sound source from the terminal apparatus 10.

In addition, the controller 230 may modulate the sound signal having two channels by convolving the HRTF corresponding to each of the sound signals having two channels.

The vehicle 20 may determine the state of the vehicle 20 based on the output of the sensor module 220 (730).

At this time, the state of the vehicle 20 may include at least one of the speed of the vehicle 20, the acceleration of the vehicle 20, whether the vehicle 20 is vibrating, whether each of the windows is opened or closed, whether the air conditioner is operated, and whether passengers are seated in each seat of the plurality of seats.

The vehicle 20 may remove the reverberation corresponding to the state of the vehicle 20 from the modulated sound signal (740).

In other words, the controller 230 of the vehicle 20 may remove the reverberation corresponding to the state of the vehicle 20 from the modulated sound signal based on at least one of the sensitivity of the plurality of microphones 110, the relative position between the plurality of microphones 110, and the HRTF.

Particularly, the controller 230 may apply the dereverberation function corresponding to the state of the vehicle 20 to the modulated sound signal to remove the reverberation corresponding to the state of the vehicle 20 from the modulated sound signal.

The vehicle 20 may control the speaker 250 to output the dereverberated sound signal (750).

Thereby, the user of the vehicle 20 may be provided with the sound signal similar to the original sound of the sound source in the specific area where the terminal apparatus 10 is positioned.

According to an aspect of the present disclosure, there are provided the vehicle and the method of controlling the vehicle, which can provide the sound similar to the original sound by modulating the sound signal obtained using the plurality of microphones of the external terminal device in consideration of the physical characteristics of the user and the reproduction space.

The disclosed embodiments may be implemented in the form of recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, and the like.

The embodiments of the disclosure have thus far been described with reference to the accompanying drawings. It is to be understood by those of ordinary skill in the art that the disclosure may be practiced in other forms than the embodiments as described above without changing the technical idea or essential features of the disclosure. The above embodiments are only by way of example and should not be interpreted in a limited sense.

What is claimed is:

1. A vehicle comprising:
    a speaker;
    a sensor module configured to detect a state of the vehicle;
    a communicator configured to receive, from a terminal apparatus including a plurality of microphones and positioned outside of the vehicle, a sound signal having two channels, information about sensitivity of each microphone of the plurality of microphones, and information about a relative position between the plurality of microphones; and
    a controller configured to:
        determine a difference value between the relative position between the plurality of microphones and a predetermined relative position between left and right eardrums;
        modulate the sound signal having two channels based on the sensitivity of each microphone of the plurality of microphones, the difference value, a relative position of a sound source with respect to the plurality of microphones, and a Head-Related Transfer Function (HRTF);
        remove reverberation corresponding to the state of the vehicle from the modulated sound signal; and
        control the speaker to output the dereverberated sound signal.

2. The vehicle according to claim 1, wherein the controller is configured to:
    determine whether the sensitivities of the plurality of microphones are different based on the sensitivity of each microphone of the plurality of microphones; and
    when the sensitivities of the plurality of microphones are different from each other, modulate the sound signal having two channels so that the intensity of sound signals corresponding to each microphone of the plurality of microphones are the same.

3. The vehicle according to claim 2, wherein the controller is configured to modulate the sound signal having two channels so that the intensity of the sound signal corresponding to each microphone of the plurality of microphones becomes equal to the intensity of the sound signal having the strongest intensity.

4. The vehicle according to claim 1, wherein the controller is configured to modulate the sound signal having two channels by adjusting the intensity of the sound signal in proportion to the determined difference value.

5. The vehicle according to claim 4, wherein when one of the microphones is moved away from the sound source when one of the microphones is positioned at a position separated by a predetermined relative position between the left and right eardrums based on one of the microphones of any one of the plurality of microphones, the controller is configured to modulate the sound signal having two channels so that the intensity of the sound signal corresponding to one of the microphones is decreased.

6. The vehicle according to claim 4, wherein when one of the microphones approaches from the sound source when one of the microphones is positioned at a position separated by a predetermined relative position between the left and right eardrums based on one of the microphones of any one of the plurality of microphones, the controller is configured to modulate the sound signal having two channels so that the intensity of the sound signal corresponding to one of the microphones is increased.

7. The vehicle according to claim 1, wherein the controller is configured to modulate the sound signal having two channels by convolving the HRTF corresponding to each of the sound signals having two channels.

8. The vehicle according to claim 1, wherein the controller is configured to apply a dereverberation function corresponding to the state of the vehicle to the modulated sound signal to remove the reverberation corresponding to the state of the vehicle from the modulated sound signal.

9. The vehicle according to claim 8, wherein the state of the vehicle comprises at least one of a speed of the vehicle, an acceleration of the vehicle, whether the vehicle is vibrating, whether each window of a plurality of windows is opened or closed, whether an air conditioner is operated, and whether passengers are seated in each seat of a plurality of seats.

10. A method of controlling a vehicle, the vehicle including a speaker, and a sensor module configured to detect a state of the vehicle, the method comprising:
receiving, from a terminal apparatus including a plurality of microphones and positioned outside of the vehicle, a sound signal having two channels, information about sensitivity of each microphone of the plurality of microphones, and information about a relative position between the plurality of microphones;
determining, by a controller, a difference value between the relative position between the plurality of microphones and a predetermined relative position between left and right eardrums;
modulating, by the controller, the sound signal having two channels based on the sensitivity of each microphone of the plurality of microphones, the difference value, a relative position of a sound source with respect to the plurality of microphones, and a Head-Related Transfer Function (HRTF);
removing, by the controller, the reverberation corresponding to the state of the vehicle from the modulated sound signal; and
controlling, by the controller, the speaker to output the dereverberated sound signal.

11. The method according to claim 10, wherein the modulating of the sound signal having two channels comprises:
determining whether the sensitivities of the plurality of microphones are different based on the sensitivity of each microphone of the plurality of microphones; and
when the sensitivities of the plurality of microphones are different from each other, modulating the sound signal having two channels so that the intensity of sound signals corresponding to each of the plurality of microphones are the same.

12. The method according to claim 11, wherein the modulating of the sound signal having two channels comprises:
modulating the sound signal having two channels so that the intensity of the sound signal corresponding to each microphone of the plurality of microphones becomes equal to the intensity of the sound signal having the strongest intensity.

13. The method according to claim 12, wherein the modulating of the sound signal having two channels comprises:
modulating the sound signal having two channels by adjusting the intensity of the sound signal in proportion to the determined difference value.

14. The method according to claim 13, wherein the modulating of the sound signal having two channels comprises:
when one of the microphones is moved away from a sound source when one of the microphones is positioned at a position separated by a predetermined relative position between the left and right eardrums based on one of the microphones of any one of the plurality of microphones, modulating the sound signal having two channels so that the intensity of the sound signal corresponding to one of the microphones is decreased.

15. The method according to claim 13, wherein the modulating of the sound signal having two channels comprises:
when one of the microphones approaches from a sound source when one of the microphones is positioned at a position separated by a predetermined relative position between the left and right eardrums based on one of the microphones of any one of the plurality of microphones, modulating the sound signal having two channels so that the intensity of the sound signal corresponding to one of the microphones is increased.

16. The method according to claim 10, wherein the modulating of the sound signal having two channels comprises:
modulating the sound signal having two channels by convolving the HRTF corresponding to each of the sound signals having two channels.

17. The method according to claim 10, wherein the removing of the reverberation from the modulated sound signal comprises:
applying a dereverberation function corresponding to the state of the vehicle to the modulated sound signal to remove the reverberation corresponding to the state of the vehicle from the modulated sound signal.

18. The method according to claim 17, wherein the state of the vehicle comprises at least one of a speed of the vehicle, an acceleration of the vehicle, whether the vehicle is vibrating, whether each window of a plurality of windows is opened or closed, whether an air conditioner is operated, and whether passengers are seated in each seat of a plurality of seats.

* * * * *